UNITED STATES PATENT OFFICE.

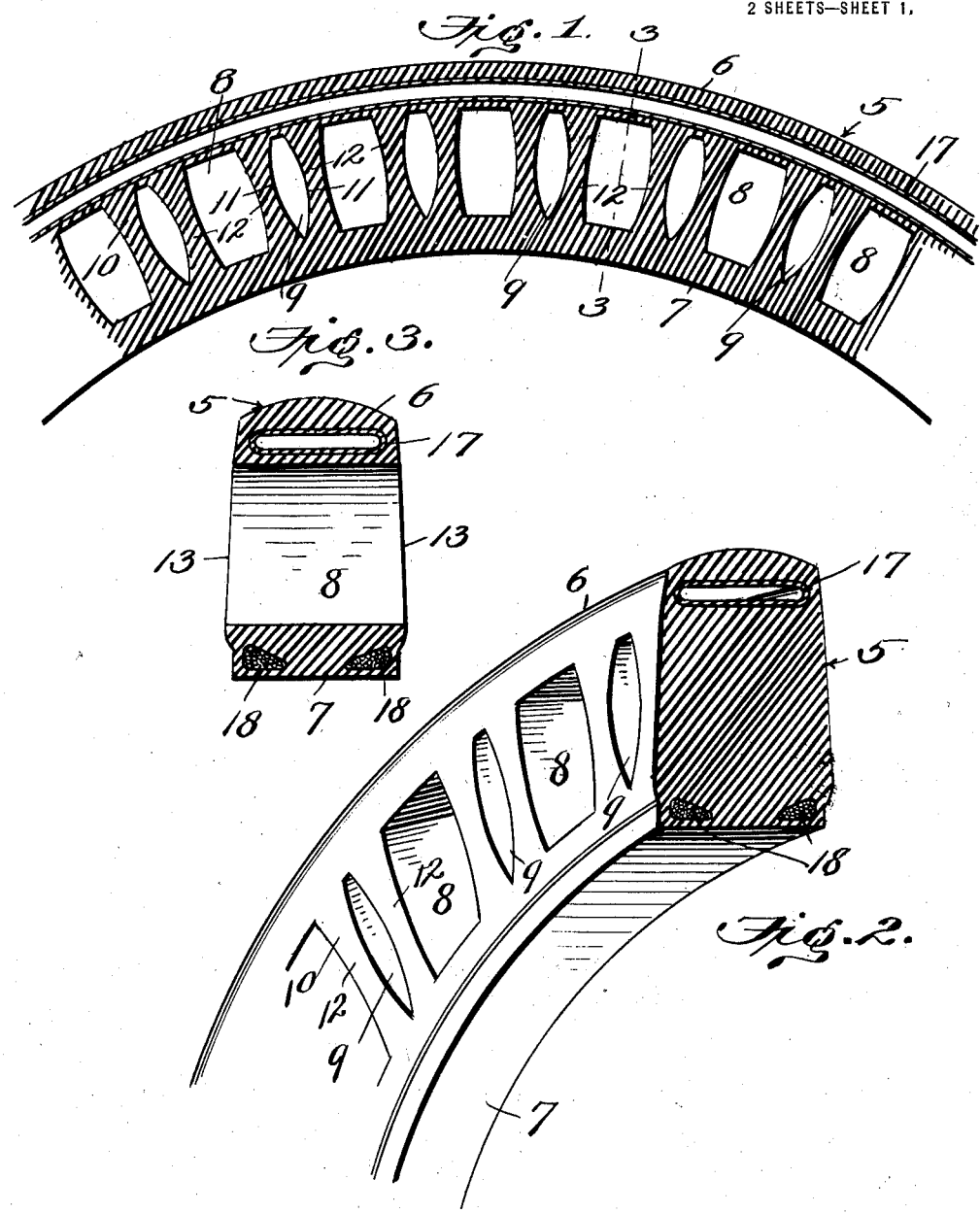

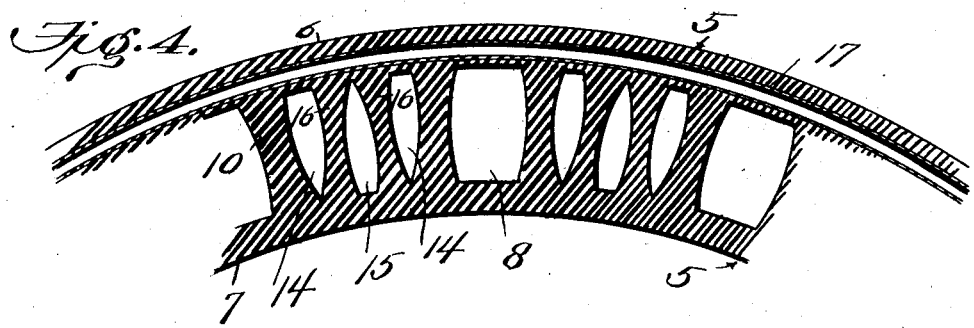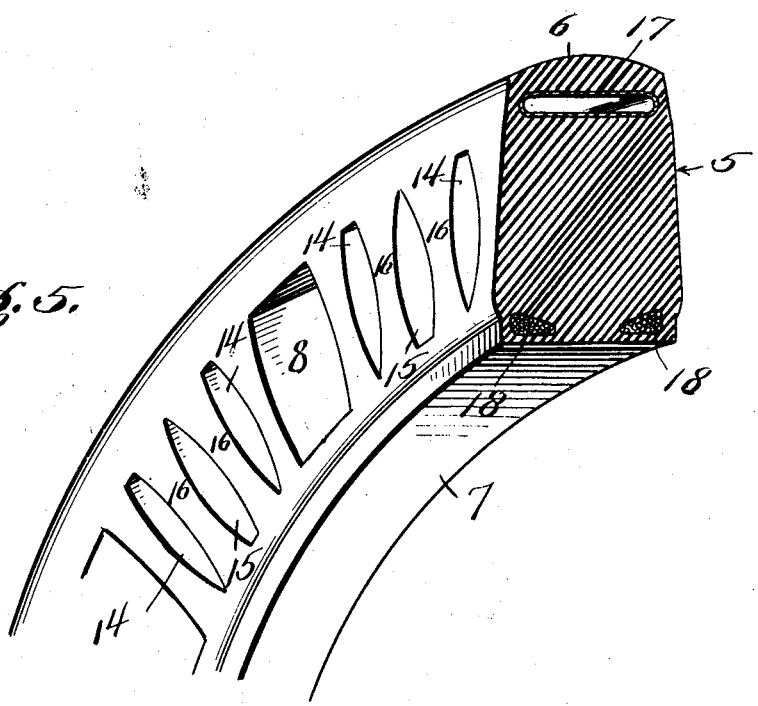

JOHN W. PEPPLE, OF SAN ANTONIO, TEXAS, ASSIGNOR OF ONE-TENTH TO JOHN J. ROWE, OF AKRON, OHIO.

VEHICLE-TIRE.

1,365,539.	Specification of Letters Patent.	Patented Jan. 11, 1921.

Application filed December 3, 1919. Serial No. 342,142.

*To all whom it may concern:*

Be it known that I, JOHN W. PEPPLE, a citizen of the United States, residing at San Antonio, in the county of Bexar and State of Texas, have invented new and useful Improvements in Vehicle-Tires, of which the following is a specification.

This invention relates to tires such as are used on the wheels of automobiles and other like vehicles, and in which inherent resiliency is desirable to absorb shocks and vibrations incident to travel over roads. The essential objects of the invention are to produce a strong and durable tire to replace the ordinary form of pneumatic tire embodying an inner tube and an outer inclosing casing, and to conserve a relative shock and vibration absorbing resiliency in a tire structure which will not be subject to the usual tire troubles arising from break-down and practical inefficiencies due to leaks, punctures, blowouts, rim cutting and other deteriorating injuries, and wherein repair delays and expense of upkeep of a tire are reduced to a minimum. A further object of the invention is to provide a tire of a cushion type wherein the weight imposed upon the tire is distributed throughout the tire structure by a simple addition introduced in the tire adjacent to the tread and coöperating with resilient braces disposed at regular intervals around the tire between the tread and rim engaging portions of the latter, and separated by openings extending fully through the tire in a transverse direction to thereby thoroughly ventilate and maintain the tire in a condition of low temperature. A still further object of the invention is to provide a cushion tire having reinforcing means in cross section of such form and disposition as to cause them to stand up to the weight and to resist collapse or lateral overthrow when the tire is subjected to traction power, particularly when starting and stopping a wheel bearing the improved tire.

With these and other objects in view the invention consists in the construction and arrangement of the several parts which will be more fully hereinafter described and claimed.

In the drawings:—

Figure 1 illustrates a part of the improved tire shown partially in side elevation and partially in longitudinal section.

Fig. 2 is a sectional perspective view of a portion of the improved tire.

Fig. 3 is a transverse vertical section taken in the plane of the line 3—3, Fig. 1.

Fig. 4 is a view similar to Fig. 1 showing a slight modification in the construction of the reinforcing cross sections or braces.

Fig. 5 is a view similar to Fig. 2 embodying the modified structure.

The numeral 5 designates the tire body which is practically integral in construction between the tread 6 and the inner wheel rim engaging portion 7, and is preferably constructed of rubber. It will be understood, however, that the tire may be constructed of rubber compound or rubber composition, or any other material which will be found to meet the requirements of tire resiliency and durability. At regular intervals the tire body is formed with transverse openings 8 and 9, the openings 8 being larger than the openings 9 and separating the braces or reinforcing sections 10 of the tire, the openings 9 dividing or extending through the said braces or sections. The openings 8 are substantially rectagular in form and the openings 9 have curved side walls 11 converging toward the rim engaging portion 7 of the tire, thereby producing in each brace 10, as shown by Figs. 1, 2 and 3, a pair of legs 12. The openings 8 and 9 extend completely through the tire in transverse directions from one side to the other, and the opposite sides 13 of the tire are straight, as clearly shown by Fig. 3. By forming the opposite sides of the tire straight, as specified, it is permitted to run close to a curbing or ledge with less liability of wearing or scratching the outer side of the tire than would be the case if it were of convex form or laterally projected beyond the wheel rim.

In Figs. 4 and 5 the structure is slightly modified and consists in increasing the length of the braces or reinforcing sections 10 and providing the latter with openings 14 and 15, the openings 15 being similar to the openings 9, as shown by Figs. 1 and 2, and the openings 15 being reverse to the openings 14. The curved walls of the openings 15 converge outwardly toward the tread 6 of the tire and by this means additional legs 16 are formed in each brace or reinforcing section, the braces or reinforcing sections in the modifications being separated by openings 8 similar to the openings shown by Figs. 1, 2 and 3. In other respects the modified form of the tire shown by Figs. 4 and 5 is identical in structure with those of the preceding figures.

The most essential feature of the present improvements is what is termed a steel breaker 17, consisting of a flat tube embedded in the tire and continuing fully around the same adjacent to the tread 6. This breaker or tubular steel reforce is preferably made by flattening a steel pipe and then bending the flattened pipe in circular form and disposing it in this shape in the mold at the time the tire is formed, so as to fully embed the same in the rubber or rubber composition during the molding operation. This breaker or wheel reforce is diametrically opposed to a steel band or hoop, in that it is not intended to have a sensitive resilient action, the essential object of this interposed flat tubular means being to equally distribute the shock or vibrations on all cross sections throughout the body of the tire, instead of affecting only a portion of the cross sections of the tire as in that class of tires which lack any means to assist in holding up or bracing the sections or reinforcing means. By means of the improved breaker located adjacent to the tread of the tire every cross section in the tire will take care of its proportionate share of the shock, but the tread near the point of contact will receive, as a matter of course the hardest part of the shock. The opening of this breaker or wheel brace will be governed in size according to the weight the tire is supposed to carry, and as an additional function the improved breaker will serve to maintain the side walls of the tire more straight on the outside, in view of the resistance in transverse directions set up by the interposition of the said tubular element. Furthermore, the improved breaker or tubular wheel reforce coöperates with and materially affects the several braces or reinforcing sections between the same and the inner rim-engaging portions of the tire, and at the same time the braces or reinforcing sections are free to set up a necessary cushioning effect which is provided for by the formation of the legs 12 and 16 in the two forms of the tire, the said legs regularly expanding and contracting lengthwise of the tire or around the latter, the greatest expansion of these legs occurring at the point of contact and adjacent to the said point of contact of the tread of the tire with the road surface and throughout the length and around the tire. This expansion and contraction is proportionately present so that the whole tire is affected and proportionately contributes to the general resilient action of the tire. The expansion of the legs 12 and 16 will depend upon the load or weight imposed upon the tire, but the improved breaker or tubular tire bracing element 17 will so equalize and distribute the weight pressure affecting the tire as to permit a predetermined size or extent of each brace or reinforced cross section to sustain considerable weight without distorting the tire. In other words, the legs 12 and 16 of the intermediate braces or reinforcing cushioning sections will be prevented from caving in when subjected to severe shock and caused to sustain the shock at the point of contact of the latter with the resilient distribution of the shock to each and every member of the intermediate braces embodying the legs through the coöperation and function of the breaker. A further important advantage of this structure is that the shock will be transmitted to all of the intermediate braces or sections embodying the legs 12 and 16, and a general coaction will ensue throughout the tire structure, or the several structural features of the improved tire will act with unitary compensation and equal distribution throughout the tire and thereby produce an advantageous cushioning effect, and at the same time the tire is prevented from having any tendency to lie down or remain flattened when running at a good speed, and particularly when turning or rounding curves. The improved breaker while not technically resilient or having a spring action, will yield as a whole to contribute to the compensation and to materially assist in the sustention and equal distribution of the weight stress which is due to the flattened hollow structural character of the breaker. This breaker will bend before it will break and is also made strong enough so that it will not be crushed or collapsed during a hard shock imposed thereon. The breaker also causes the tire to pull much easier as the expansion of the surface contacting portion of the tire is prevented from being as great as in a tire without a device of this character and in turning or rounding curves the breaker comes permanently into play as an effective structural feature to prevent lateral and irregular disposition of the several intermediate bracing or reinforcing sections which give the tire its cushioning action. In referring to the flattened tube 17, as a "breaker," it is intended to be understood that this device breaks up any tendency to collapse, or irregular movement of the intermediate cushioning elements of the tire, and also to break up any disadvantageous action of varying weight stresses that might tend to impair the practical efficiency of the tire. The improved tire also embodies wires 18 embedded in the same at opposite sides of the center of the inner rim-engaging portion to assist in holding the tire in connection with the rim of the wheel.

It will be understood that the several parts of the tire, including the breaker, will be modified in proportions and dimensions to adapt the improvement for use on vehicles designed to have varying load capacities, or to compensate for varying weight stresses that may be imposed upon the tire.

What is claimed as new is—

1. A tire comprising an integral body of elastic material including a tread and inner rim-engaging portion, the body between the tread and inner rim-engaging portion being formed with a plurality of openings alternately of different dimensions and extending transversely therethrough to provide radial legs to form resilient sections, and an elongated flattened tube with parallel sides embedded in the body of the tire close to the tread portion and extending across the tire and terminating adjacent to opposite sides thereof and also continuing fully around the tire.

2. A tire comprising an integral body of elastic material including a tread and inner rim-engaging portion and intermediate resilient sections arranged in coöperating pairs and embodying separated vibrating legs formed by alternate openings extending transversely through the tire, the openings being of such contour as to give the legs less width at their intermediate portions than at the upper and lower terminals thereof where they intersect respectively with the tread and rim-engaging portion to provide for sensitive resilient cushioning action, and a flattened tube with inner and outer parallel sides, the tube being embedded within the tire close to the tread portion thereof and extending transversely of and terminating at opposite ends close to the opposite sides of the time but fully inclosed by the latter, the flattened tube being disposed between the outer terminal walls of the openings and the tread of the tire and operating to prevent breaking down of the said sections when the tire is under starting and stopping stresses.

3. A tire comprising an integral body of elastic material having a tread and inner rim-engaging portion, and a flattened tube having inner and outer parallel sides, the tube being embedded within the tire close to the tread portion and extending transversely across and having its opposite ends terminating close to the opposite sides of the tire fully within the latter, the tire from the tube near the tread to the inner rim-engaging portion being composed solely of elastic material and free of embedded restrictive means, the said tube extending fully around the tire.

In testimony whereof I have hereunto set my hand in presence of two subscribing witnesses.

JOHN W. PEPPLE.

Witnesses:
 Louis H. Amer,
 Edward L. Ahern, Jr.